United States Patent [19]
Galvin

[11] 3,863,240
[45] Jan. 28, 1975

[54] ELECTROMAGNETIC INTRUSION DETECTION SYSTEM

[75] Inventor: Aaron A. Galvin, Lexington, Mass.

[73] Assignee: Aerospace Research, Inc., Boston, Mass.

[22] Filed: Dec. 8, 1972

[21] Appl. No.: 313,613

[52] U.S. Cl............ 340/258 C, 343/5 PD, 343/7.7
[51] Int. Cl. .......................................... G08b 13/18
[58] Field of Search........ 340/258 C, 258 R, 258 A; 343/7.7, 5 PD

[56] References Cited
UNITED STATES PATENTS

| | | | |
|---|---|---|---|
| 2,826,753 | 3/1958 | Chapin | 340/258 C |
| 3,163,861 | 12/1964 | Suter | 343/5 PD |
| 3,331,065 | 7/1967 | McDonald | 343/7.7 |
| 3,343,167 | 9/1967 | Rademacher | 343/5 PD |
| 3,665,443 | 5/1972 | Galvin | 340/258 R |

Primary Examiner—Glen R. Swann, III
Attorney, Agent, or Firm—Weingarten, Maxham & Schurgin

[57] ABSTRACT

An electromagnetic intrusion detection system employs changes in the amplitude and/or phase of energy returned from objects in a zone under surveillance to indicate the introduction of a target. An electromagnetic field is provided in the protected zone and sensed by a receiver which includes a processor operative to provide signals representative of the position of objects in the protected zone. A net change in the position of an object or the introduction of an intruder causes a sensible change in the signals which is employed to activate an alarm.

8 Claims, 5 Drawing Figures

ELECTROMAGNETIC INTRUSION DETECTION SYSTEM

FIELD OF THE INVENTION

This invention relates to intrusion detection systems and more particularly to systems for the electromagentic detection of a target which enters within an area of surveillance.

BACKGROUND OF THE INVENTION

In Doppler intrusion alarm systems, a transmitted signal is directed into a zone under surveillance and a signal returned from a moving target within this zone is mixed with a reference signal to produce a beat frequency representative of the Doppler frequency of the moving target and which is employed to energize a suitable alarm. The efficiency and commercial utility of such alarm systems depends in large measure on the ability of the system to discriminate between true moving targets and noise or other interfering phenomena caused by conditions present in the surveillance zone. In general, signal processing techniques have been employed to discriminate, on the basis of frequency or gain, targets from noise, and extremely sophisticated techniques have been developed but at the expense of added system cost and complexity. Moreover, in a Doppler system an intruder can defeat the system by moving along a circumference centered on the transmitter receiver since there is then only a small component of motion toward or away from the transmitter receiver to produce the Doppler shift. If the intruder is moving but stays at a range which varies by no more than one half wavelength at the transmitted frequency, less than one Doppler cycle will result, and the commonly used techniques of Doppler processing will not function properly to indicate intruder presence.

SUMMARY OF THE INVENTION

In accordance with the present invention, an electromagnetic alarm system is provided in which net changes over a given short period of time in the amplitude and/or phase of energy returned from objects in a zone under surveillance are detected to indicate intruder presence and to energize a suitable alarm. Because the system will respond to an amplitude and/or phase change it is not necessary for the target to produce a Doppler frequency. Only a small net change in target range is needed to cause an alarm, target range being defined as the sum of the target-to-transmitting-antenna distance and the target-to-receiving-antenna distance.

Briefly, the system includes a transmitter for providing an electromagnetic field in a zone under surveillance, a receiver for receiving the transmitted radiation, and including a single channel or quadrature mixer operative in response to received signals to provide low frequency output signals which are A.C. coupled to a low cutoff frequency amplifier. The amplified output signals are limited and processed by a narrowband lowpass filter for application to a bipolar threshold circuit, the output of the threshold circuit being employed to energize an alarm indicator or other utilization apparatus.

Energy received from the walls, floor and ceiling of the protected area and from stationary objects therein is of fixed amplitude and phase relative to the transmitted carrier such that the output of the mixer exhibits a constant D.C. level. The audio amplifier by reason of the A.C. coupling thereto provides an output signal which after an initial turn-on period will remain at essentially a zero voltage or other reference level in response to the constant D.C. output from the mixer. The threshold level of the bipolar threshold circuit is greater than the reference level and a signal will be provided for alarm actuation only upon exceedance of the threshold. In the event that a target becomes present within the protected zone, giving rise to energy changes in amplitude and/or phase sensible by the receiver, the average output voltage level of the mixer will be of correspondingly changed amplitude. This voltage change is amplified and lowpass filtered to provide a signal which will exceed the bipolar threshold level to thus signal an alarm.

The system according to the invention offers particular advantages over Doppler intrusion alarms. The invention provides reliable detection of an intruder at any point within a protected area and does so for any direction of intruder motion.

Moreover, the novel system is highly insensitive to radio-frequency interference, by reason of the system bandwidth being at least an order of magnitude smaller than required in Doppler systems. The novel system is also insensitive to vibrating or swaying objects within the protected zone so long as the sway period is not much greater than the "minimum time to alarm," which is the predetermined time that the target signal must be present to cause an alarm.

DESCRIPTION OF THE DRAWINGS

The invention will be more fully understood from the following detailed description taken in conjunction with the accompanying drawings in which.

DETAILED DESCRIPTION OF THE INVENTION

Figures 1, 2:
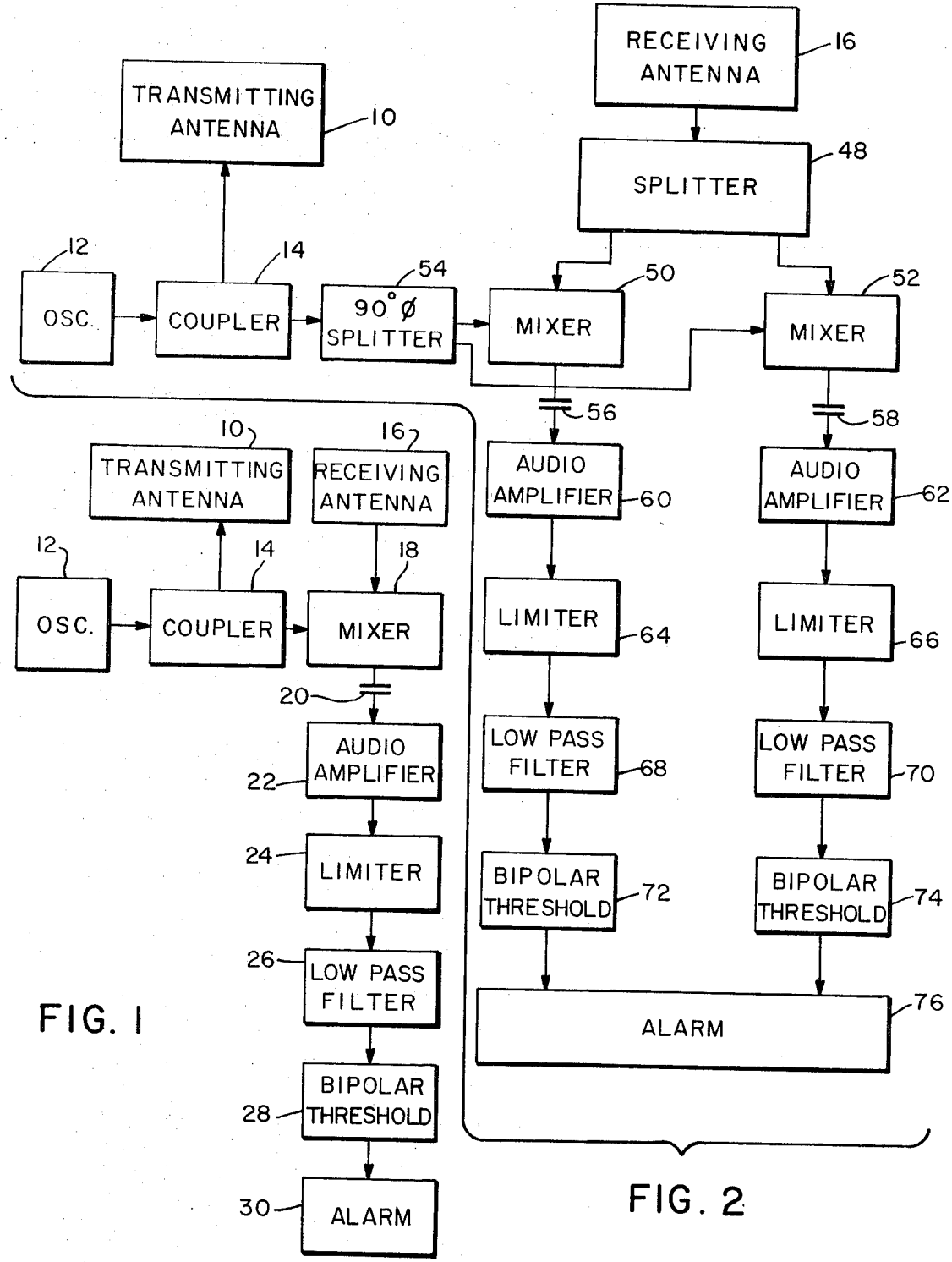
FIG. 1 is a block diagram representation of an intrusion detection system according to the invention.
FIG. 2 is a block diagram representation of a two channel version of the detection system.

An electromagnetic intrusion detection system embodying the invention is illustrated in FIG. 1 and includes a transmitting antenna 10 operative to provide a radiation field within an intended zone to be protected and energized by a signal from a stable oscillator 12 and applied to the antenna via a coupler 14. A receiving antenna 16 senses radiation in the surveillance zone provided by the transmitting antenna and provides an output signal to a mixer 18 which is operative to provide conversion of the received signal to baseband. The local oscillator signal for mixer 18 is provided by coupler 14.

Most typically, the transmitting antenna 10 is disposed at one end of a protected zone and is configured to provide an intended radiation pattern within the volumetric space of the protected zone. The receiving antenna 16 has a like configuration and is disposed at the opposite end of the protected zone. The antennas can also be otherwise disposed, for example, both receiving and transmitting antennas can be located at the same side of a zone being protected. Moreover, a single antenna can be time-shared to serve both transmission and reception functions.

The output signal of mixer 18 is A.C. coupled via capacitor 20 to an audio amplifier 22, the amplified output signals of which are applied to a limiter 24. The output signal of the limiter 24 is applied to a lowpass filter 26 which serves as an integrator and the output signal of which, in turn, is applied to a bipolar threshold circuit 28. The cutoff frequency of filter 26 is usually less than 1Hz and in conjunction with the cutoff frequency of capacitor 20 and its load impedance determines the coherent system bandwidth. The output signal of the threshold circuit is applied to alarm apparatus 30 which may include, for example, an alarm indicator or other utilization apparatus for signalling or recording an alarm condition.

The output signal from mixer 18 is of a magnitude representative of the amplitude and/or phase of energy received by antenna 16 and representative of the character of the zone under protection, including the position of stationary objects therein. In the presence of a target within the protected zone, energy received by antenna 16 will be varied in either amplitude or phase or both, caused by the perturbation of the electromagnetic field due to the presence of the target therein. These energy variations sensed by antenna 16 give rise to mixer output signals which vary in magnitude correspondingly. The bipolar threshold levels provided by circuit 28 are initially determined in accordance with the characteristics of the zone being protected such that the mixer output signals, in the absence of a target, are below the preset thresholds, by selected amounts.

The output signals of mixer 18 are processed by the threshold circuit 28, and upon exceedance of either threshold by the mixer output signals, causes an output indication to be provided for energization of alarm 30 or other utilization apparatus. The limiter 24 is employed to limit the amplitude of signals received from audio amplifier 22 to prevent a large signal from slewing the lowpass filter output voltage too rapidly, which would cause the threshold level to be reached in a time less than the defined minimum alarm time. Such a large signal can occur typically from a half cycle of sway of a close swaying object, or from radio frequency interference (RFI) which sweeps across the narrow band of the receiving system. The slew rate of the signal from amplifier 22 is a function of the signal amplitude, which is limited by operation of limiter 24, and the time constants of limiter 24, lowpass filter 26 and threshold circuit 28.

An electromagnetic intrusion detection system embodying a two-channel version of the invention is illustrated in FIG. 2 and includes as in FIG. 1, a transmitting antenna 10 energized by a signal from a stable oscillator 12 and applied to the antenna via a coupler 14. A receiving antenna 16 senses radiation in the surveillance zone provided by the transmitting antenna and provides an output signal to a power splitter 48, the respective output signals of which are applied to first and second mixers 50 and 52 which are operative to provide quadrature mixing of the received signal. Quadrature phased reference signals for the mixers are provided by a 90° phase splitter 54 which receives as an input signal a portion of the oscillator signal provided by coupler 14.

The output signals of mixers 50 and 52 are A.C. coupled via respective capacitors 56 and 58 to respective audio amplifiers 60 and 62, the amplified output signals of which are applied to respective limiters 64 and 66. The output signals of each limiter are applied to a respective narrowband lowpass filter 68 and 70, the output signals of which, in turn, are applied to respective bipolar threshold circuits 72 and 74. The output signals of the threshold circuits are applied to alarm apparatus 76 which again may include an alarm indicator or other utilization apparatus.

A typical system according to the invention operates at a frequency of 915 MHz which is within a band authorized by the Federal Communications Commission for intrusion alarms. Other operating frequencies can be used as long as a target after entry into the protected zone is "stationary" relative to the wavelength of the particular frequency selected. Very rapid motion of a target through the protected zone tends to produce an averaged output signal which may not cause an alarm or which can cause an alarm only after a relatively long time interval. The term "stationary" relates to the minimum interval of time for which a net change in the amplitude and/or phase of returned energy must occur for purposes of target detection. In the presence of a fast moving target there would not be any net sensible change in amplitude and/or phase for detection purposes over a relatively short integration interval.

Figure 3A:
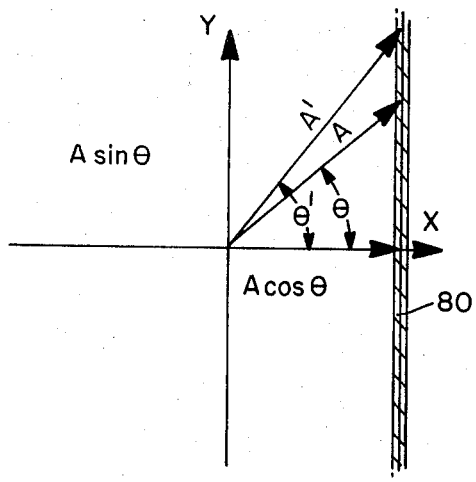
FIGS. 3A and 3B are vector diagrams useful in illustrating operation of the invention.
Figure 3B:
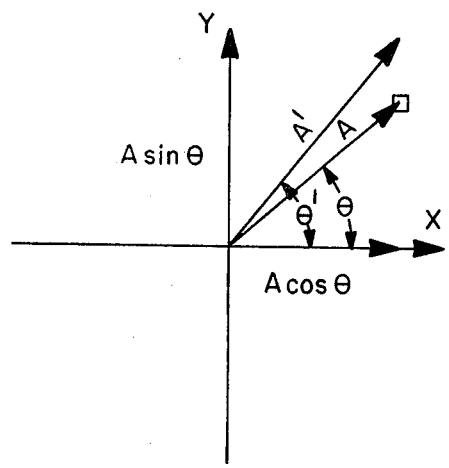

The backscatter of energy from a protected zone can be represented graphically by a vector of length A at an angle $\theta$, as shown in FIG. 3A. The presence of an intruder in a protected zone will cause a change in the resulting amplitude and/or phase of the vector (A'); however, the X-axis change, $A'\cos\theta$, will not be sufficient for detection of a class of vectors which terminate along the vertical dashed band 80 shown in FIG. 3A, and changes in the vector which fall in this band will not be sensed by the system. If a quadrature channel is employed, the nondetectable area can be reduced to a small region at the tip of the vector A shown in FIG. 3B. So long as a vector falls outside of this region, such as vector A' in FIG. 3B, the system will detect intruder presence; that is, the Y-axis change, $A'\sin\theta'-A\sin\theta$, will be sufficient for detection. Although the single channel system will not likely detect a single step made by an intruder in a protected zone, the more usual situation of an intruder taking more than one intrusive step will be detectable by the single channel system. Higher sensitivity is provided by the quadrature system for those instances where needed.

In the embodiments discussed, a cable, such as a shielded coaxial cable, is employed between the transmitting and receiving portions of the system to couple part of the transmitter signal to the phase splitter for provision of the mixer local oscillator. Such cabling may present installation or esthetic problems in a particular protected zone and may add considerable cost to the system, especially in large areas being protected. In an alternative embodiment of the invention, depicted in FIG. 4, the transmitting and receiving portions of the system need not be interconnected or otherwise coupled by any wired path.

Figure 4:
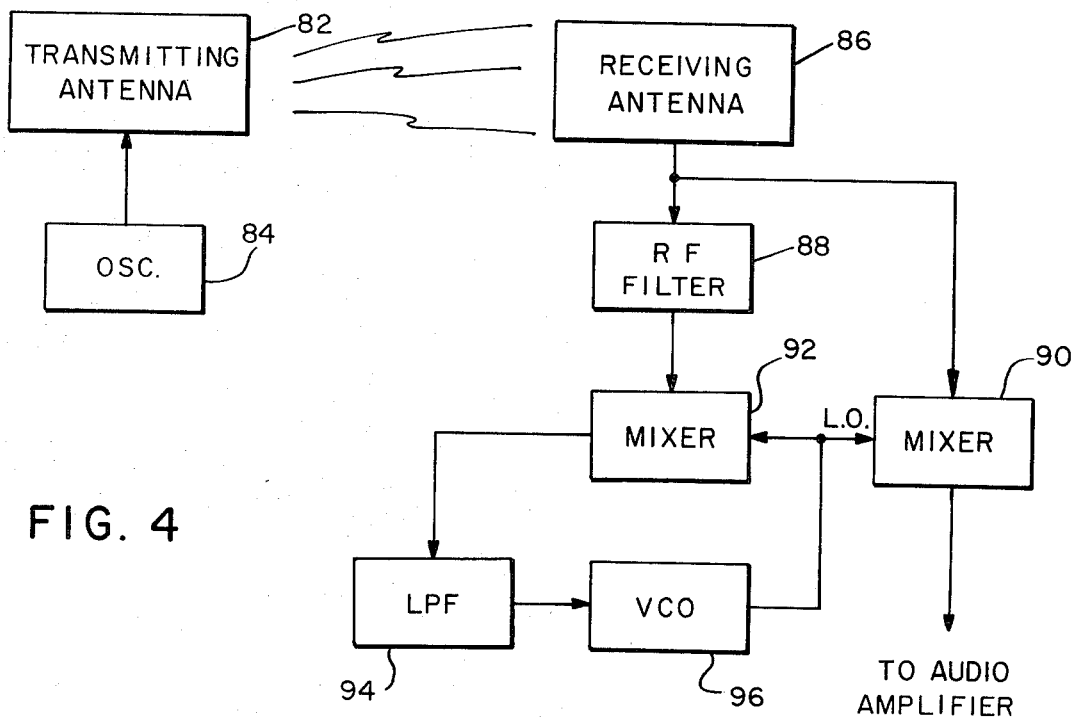
FIG. 4 is a block diagram representation of an alternative embodiment of the invention.

Referring to FIG. 4 a transmitting antenna 82 energized by a stable oscillator 84 is employed to provide an intended radiation field in a protected zone. A receiving antenna 86 receives the transmitted radiation and provides a signal to an RF filter 88 and also to a mixer 90. The output of RF filter 88 is applied via a mixer 92 and lowpass filter 94 to the input of a voltage controlled oscillator 96. The output of oscillator 96 is coupled to an input of mixer 92 and is also coupled to the mixer 90 as a local oscillator signal therefor. It will be appreciated that mixer 92, lowpass filter 94 and voltage controlled oscillator 96 function as a phase lock loop to provide a stable local oscillator signal to mixer 90. The output signal of mixer 90 is applied to an audio amplifier and subsequent components as described above in connection with the embodiment of FIG. 1. It will be appreciated that this version of the invention is also useful in a quadrature channel implementation, in which case, mixer 90 would be a quadrature mixer and a pair of quadrature output signals would be provided for application to further processing components as in FIG. 2.

Various modifications and alternative implementations of the invention will now occur to those versed in the art without departing from the spirit and true scope thereof. Accordingly, it is not intended to limit the invention by what has been particularly shown and described except as intended in the appended claims.

What is claimed is:

1. An electromagnetic intrusion alarm system for detection of an intruder in a surveillance zone irrespective of intruder motion, said system comprising:
   means for providing an electromagnetic field in a zone under surveillance and including:
   oscillator means for providing a signal of predetermined fixed frequency;
   transmitting antenna means for providing said electromagnetic field in response to said oscillator signal; and
   coupler means for conveying said oscillator signal to said antenna means and for providing a local oscillator signal;
   receiving antenna means for receiving electromagnetic energy returned from said zone;
   mixer means operative in response to the output signal from said receiving antenna means and to said local oscillator signal to provide a signal of substantially constant output level under static conditions in which no intruder is present within said zone, and of a different average output level in the presence of net amplitude and/or phase changes in received energy caused by intruder presence within said zone;
   means for establishing a reference threshold in accordance with the static positional characteristics of said zone and objects therein and of a level greater than said average output level of said mixer means;
   means having a bandwidth substantially less than the bandwidth necessary for processing Doppler signals and operative in response to said signal of substantially constant output level to provide an output signal having an amplitude less than said threshold level, and operative in response to said signal of different average output level to provide an output signal having an amplitude greater than said threshold level and which is representative of the net change in the amplitude and/or phase of said received energy to thereby represent irrespective of intruder motion the net change in the positional characteristics of said zone and objects therein; and
   means for providing an alarm indication of intruder presence only upon exceedance by said output signal of said reference threshold.

2. The system according to claim 1 wherein said output signal providing means exhibits a system bandwidth of less than 1 Hz.

3. The system according to claim 1 wherein said output signal providing means includes:
   amplifier means for amplifying said signal;
   means for AC coupling said signal to said amplifier means;
   limiter means for limiting the maximum amplitude of said amplified signal; and
   integrator means operative to integrate the signal from said limiter means to provide said output signal.

4. The system according to claim 3 wherein said alarm providing means provides a minimum time interval for which said output signal must exceed said threshold level to cause said alarm indication.

5. An electromagnetic intrusion alarm system for detection of an intruder in a surveillance zone irrespective of intruder motion, said system comprising:
   means for providing an electromagnetic field in a zone under surveillance and including:
   oscillator means for providing a signal of predetermined fixed frequency;
   transmitting antenna means for providing said electromagnetic field in response to said oscillator signal; and
   coupler means for conveying said oscillator signal to said antenna means and for providing a local oscillator signal;
   receiving antenna means operative in response to electromagnetic energy returned from said zone to provide at least one signal representative of said returned energy;
   mixer means operative in response to said at least one signal from said receiving antenna means and to said local oscillator signal to provide at least one mixer signal having a substantially constant output level under static conditions in which no intruder is present within said zone, and having a different average output level in the presence of net amplitude and/or phase changes in received energy caused by intruder presence within said zone;
   means for establishing a reference threshold in accordance with the static positional characteristics of said zone and objects therein and of a level greater than said average output level of said mixer means;
   means having a bandwidth substantially less than the bandwidth necessary for processing Doppler signals and operative in response to said at least one mixer signal of substantially constant output level to provide at least one output signal of amplitude less than said threshold level, and operative in response to said at least one mixer signal of different average output level to provide at least one output signal of amplitude greater than said threshold level and which is representative of the net change in the amplitude and/or phase of said received energy to thereby represent irrespective of intruder motion the net change in the positional characteristics of said zone and objects therein; and
   means for providing an alarm indication of intruder presence only upon exceedance by said at least one output signal of said reference threshold.

6. The system according to claim 5 wherein said receiving antenna means includes a power splitter operative to provide two signals representative of said returned energy;

and wherein said mixer means includes a phase splitter operative in response to said local oscillator signal to provide quadrature phased local oscillator signals for said mixer means;

said mixer means, threshold means and output signal providing means providing quadrature processing of said mixer signals.

7. The system according to claim 5 wherein said signal providing means includes:

audio amplifier means for amplifying said at least one mixer signal;

means for AC coupling said at least one mixer signal to said audio amplifier means;

limiter means for limiting the maximum amplitude of said amplified at least one mixer signal; and narrowband means to integrate the signal from said limiter means, the signal from said integrator means being applied to said threshold means.

8. The system according to claim 5 wherein said output signal providing means includes narrowband means having a bandwidth of less than 1 Hz.

* * * * *